ROCKETS AND SEAT EJECTING APPARATUS

Original Filed Sept. 8, 1960 2 Sheets-Sheet 1

INVENTOR:
JAMES T. THORP

BY Sutherland, Polster and Taylor
ATTORNEYS.

ROCKETS AND SEAT EJECTING APPARATUS

Original Filed Sept. 8, 1960 2 Sheets-Sheet 2

INVENTOR:
JAMES T. THORP
BY Sutherland, Polster and Sofka
ATTORNEYS.

United States Patent Office

Re. 25,612
Reissued July 7, 1964

25,612

ROCKETS AND SEAT EJECTING APPARATUS

James T. Thorp, Webster Groves, Mo., assignor to Lambert Engineering Company, St. Louis, Mo., a corporation of Missouri Original No. 3,079,111, dated Feb. 26, 1963, Ser. No. 54,657, Sept. 8, 1960. Application for reissue Jan. 6, 1964, Ser. No. 344,799
20 Claims. (Cl. 244—122)

Matter enclosed in heavy brackets [ ] appears in the original patent but forms no part of this reissue specification; matter printed in italics indicates the additions made by reissue.

This invention is specifically directed to apparatus for ejecting a seat and occupant from aircraft, the ejecting force being supplied in whole or in part by rockets. It should be understood, however, that various aspects of the invention have general application in rockets.

One type of seat ejector makes use of a catapult formed by a pair of telescoping tubes extending vertically along the seat back. The upper tube is fixed to the seat and the lower tube is fixed within the aircraft. The products of combustion form a discharge of propellant ignited within the tubes creates a force which extends the tubes, thereby propelling the seat and occupant clear of the aircraft. The height of ejection depends necessarily upon the acceleration force and length of time over which this force is effective. Acceleration cannot exceed a certain value without damaging physiological consequences, and the length of time over which the acceleration force is effective depends upon the length of the catapult, which is limited by the space available within the aircraft. These limitations are such that with modern high speed aircraft, a satisfactory ejection is not possible with a catapult alone.

Accordingly, it has been proposed that a rocket be incorporated with the catapult, the rocket becoming operative to supply a further accelerating force subsequent to that provided by the catapult. The rocket is contained within the upper catapult tube and may have a rearwardly canted nozzle so as to provide a forward, as well as vertical, component of acceleration. The nozzle is usually located near the bottom of the seat and at an angle so that the line of thrust extends through or near the center of the seat-occupant mass, thereby to avoid tumbling.

The present disclosure is directed to a rocket system offering certain advantages over apparatus wherein a rocket and catapult are combined in a single tubular assembly. If the rocket is located behind the seat back, as it must be in order to be incorporated within a catapult, the resulting limitations upon the location of the rocket nozzle limit the vertical component of thrust, bearing in mind that the line of thrust should extend near the center of the mass. In other words, if the vertical component of thrust is to be increased, while avoiding excessive forward thrust and tumbling, the nozzle must be lowered relative to the seat, and this is not always feasible since the space available is limited. The combined catapult-rocket ejector requires a strong seat back, which means that the weight of the seat is considerable, and the catapult presents problems in seat adjustment since it is partly fixed to the airframe and seat. The single center rocket also presents a problem where there are two seats in tandem. If the forward seat is ejected first, the rocket blast therefrom may well burn the occupant of the rear seat. Among other disadvantages of the combined rocket-catapult ejector may be noted large size, weight and complexity of the apparatus.

Accordingly, an object of this disclosure is to provide an ejecting system which overcomes the disadvantages mentioned above. Among the more specific objects may be noted the provision of rocket ejector apparatus which is extremely compact and of a shape such that it can readily be mounted within a space presently available under the seat, thereby eliminating the necessity for a strong heavy seat back; the provision of a rocket-type ejector apparatus that provides better selection of thrust angles while miantaining a line of thrust near the center of the seat-occupant mass; the provision of ejection apparatus wherein rocket blast is directed outwardly away from the occupant of a back seat; the provision of ejector apparatus of a character such as to provide for a wide variety of thrust forces and directions with minimum tooling costs; and the provision of apparatus disclosed which is economical, space saving and simple in construction.

Although the apparatus will be described in detail with reference to the drawings, briefly, it may be noted that a rocket [assembly] *motor* is mounted *generally* horizontally beneath the seat. The [assembly] *rocket motor* includes at least [two rockets] *one propellant chamber* and the nozzle[s] *means* thereof are [canted] *directed* [rearwardly and] downwardly *as well as, if desired, directed otherwise,* thereby to provide a *center line of* thrust [line] extending *through or* near the center of gravity of the seat-occupant mass. *In order to avoid injury to the occupant of a seat immediately behind the ejected seat, the rocket motor may have its nozzle means* [The rockets are further] mounted on opposite sides of the center line and [the nozzles may be] canted outwardly[.] *so that* the blast *is* [thereby being] directed *divergingly outward* [outwardly so as not to injure the occupant of a seat immediately behind the ejected seat]. The rocket assembly may be used with or without a separate catapult.

In the interest of conserving space, the nozzles *may be retractable and* are initially retracted. Movement to the advanced position is necessary in order to provide a passage of adequate size for passage of the propellant gases to the nozzles, and the nozzles are extended by the force of the propellant gases when the propellant is ignited. In addition, the nozzles may be releasably retained in the assembly by special break-neck means. In the event that the pressures within the rocket exceed a safe limit, the entire nozzle is then blown clear, to provide a large opening through which the gases may escape.

It is further contemplated that the rockets will be interconnected in clusters so as to achieve a crossover ignition effect. For example, a series of tubes may be mounted upon a common ignition header or nozzle header, with a passage formed in the header communicating to the several chambers formed by the tubes. Accordingly, the propellant grains in the several tubes are interconnected to assure ignition in all tubes once the grain in any one tube ignites.

Other features of the invention will be in part apparent from and in part pointed out in the following detail description taken in connection with the accompanying drawings, in which.

Figure 1:
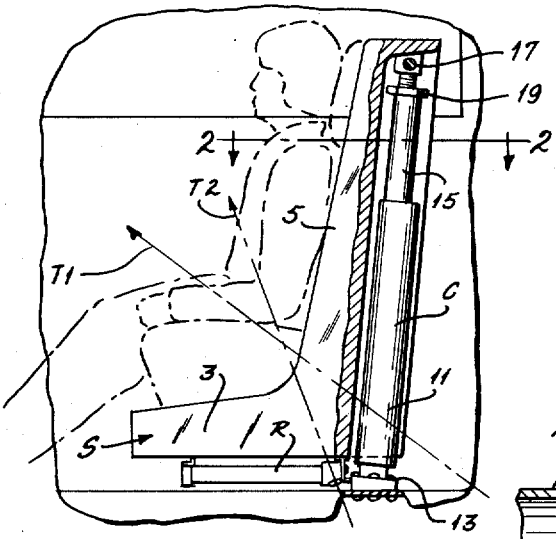
FIG. 1 is a side elevation, parts being broken away, illustrating a seat ejecting system embodying the invention.
Figure 2:
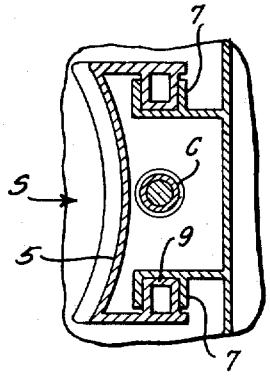
FIG. 2 is a vertical section taken generally on the line line 2—2 of FIG. 1.
Figure 7:
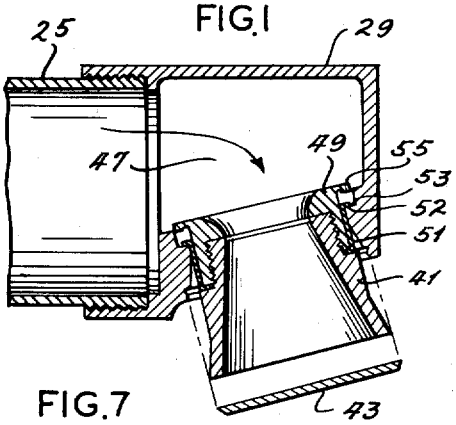
FIG. 7 is a view similar to that of FIG. 6, but with the nozzle advanced to its operated position.

Referring to FIGS. 1 and 2 of the drawings, there is shown an ejection seat S such as might be provided within aircraft or other vehicles. *As shown the* [The] seat [,] *is of a conventional type wherein the usual conformable surface, upon which the buttocks of the occupant rest, is supported by* [which has] a bottom *frame* 3, and *a similar conformable surface, against which the back of the occupant rests, is sustained by a* back *frame* 5 [,]. *In the form shown, the frames 3 and 5 are unitary and* [is] mounted for vertical movement on guide rails 7 fixed within the vehicle. For example, the rails may be channel-like members facing outwardly, and guide elements 9 fixed to the back *frame* of the seat ride within the channels (FIG. 2).

FIGS. 1 and 2 also illustrate a catapult C extending vertically along the back of the seat and arranged to eject the seat from the vehicle. The catapult is a piston-like device having a lower outer tube 11 secured at 13 to a fixed part of the vehicle and an upper inner tube 15 secured at 17 to the upper part of the [seat] back *frame 5*. A quick-release lock (not shown) is incorporated within the tubes, so as normally to secure the seat against vertical movement, although *an* adjustable threaded member 19 [might] *may* be provided at the upper end of the tube 15 to permit adjustment of the seat. It will be understood that a charge of propellant and a suitable igniter are contained within the tubes. When the propellant is fired, the tube lock is released and the expanded gases drive the tube [13] *15* upwardly, thereby carrying the seat and occupant clear of the vehicle.

It has been found that a catapult alone does not provide sufficient ejection force, at least under some conditions of high-speed aircraft operation. For example, a simple catapult may not lift the seat and occupant to an elevation sufficient to provide for opening of a parachute when the aircraft is on or near the ground. This is so because the permissible thrust (acceleration) should not exceed a predetermined limit (that which the occupant can tolerate) and because the length of time over which the catapult thrust is effective is necessarily limited by the length of the catapult tubes, a factor determined by the space available within the vehicle.

For this reason, it has been proposed that a rocket be incorporated within the upper tube, the rocket being fired after the tubes separate, thereby to prolong the vertical thrust and lift the seat and occupant to a higher elevation. Such a rocket has a rearwardly canted nozzle at its lower end, and the line of thrust thereof passes near the center of gravity of the seat-occupant mass, in order to avoid tumbling.

Although the combined catapult-ejector represents an improvement over the catapult alone, there are certain disadvantages. The thrust developed by the rocket is considerable (perhaps seven thousand pounds), hence the seat, particularly the back, must be strongly constructed and hence heavy. Also, the location of the rocket within the catapult creates a problem in achieving adequate vertical thrust without an excessive forward component of thrust. This is indicated by the dashed lines T–1 and T–2 of FIG. 1, the line T–1 indicating a typical thrust angle for a catapult contained rocket. The line T–2 [is that] *indicates the direction* of the thrust produced by the *hereinafter described embodiment* [ejector system] of this invention. Another difficulty with the catapult contained rocket system arises in multiple-seat vehicles, where the seats are located in tandem, since the rocket blast from the forward seat is directed [straight back] at the occupant in the rear seat.

These difficulties are herein overcome by mounting a plurality of relatively small rockets beneath the seat bottom so as to extend generally horizontal, the rockets (*in the embodiment shown in the drawings*) having nozzles *directed in general alignment with the take-off trajectory of the occupant-seat mass' center of gravity; which nozzles, if need be, can be* canted rearwardly, downwardly and/*or* outwardly. The grouped rockets are indicated diagrammatically at R in FIG. 1 and are illustrated in greater detail in FIGS. 3–9. By providing a plurality of relatively small rockets in a group, the space requirements are reduced to a minimum—indeed, the entire rocket assembly readily fits within a space presently available. Such a rocket assembly might have a vertical dimension of about two inches, a length (*fore-aft*) of about fourteen inches, and a width (*port-starboard*) of perhaps twelve to eighteen inches *depending upon the number of rockets in a group, and the number of groups.* By utilizing several rockets on opposite sides of the center line, the nozzles thereof may be directed outwardly clear of passengers immediately behind the ejected seat. In addition, the multiple rocket tend to provide greater reliability in the sense that there is greater possibility of ignition (at least of some of the rockets) as compared with a single rocket, and the thrust is readily changed merely by adding or removing individual rocket units.

The rocket arrangement of this disclosure may be utilized with or without a catapult. If a catapult is not utilized, provision may be made within the aircraft for directing the initial rocket blast downwardly through a readily broken thin section of the *aircraft's* skin, so that the blast does not tear up the aircraft framework to an extent such that other occupants might be injured by flying parts. In any event, the location of the rockets beneath the seat permits a considerable simplification and weight reduction in the seat, *as well as a greater amplitude of choice in thrust angularity, than is achievable when the rocket is carried by the seat back.*

Figure 3:
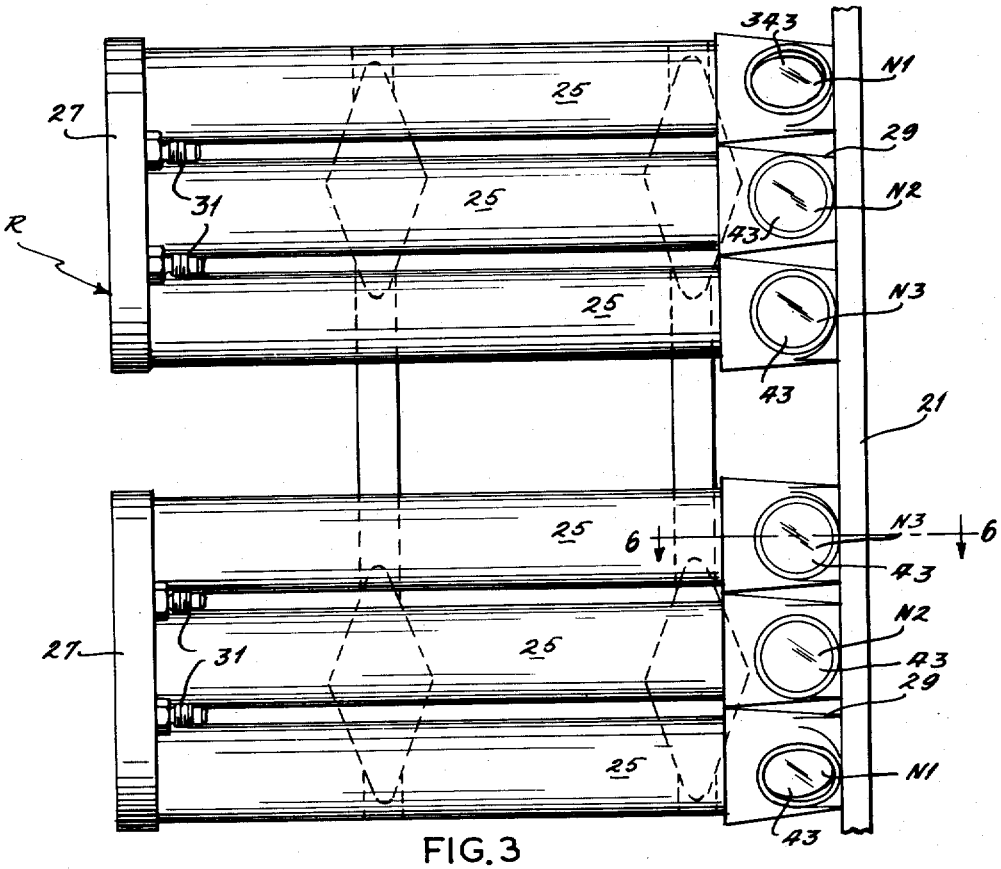
FIG. 3 is a bottom plan view of *one form of* the rocket assembly mounted beneath the seat.
Figure 4:
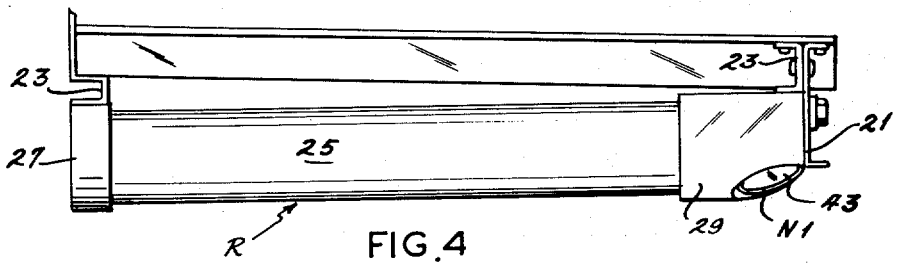
FIG. 4 is a side elevation of the rocket assembly *shown in FIG. 3*.

Referring more specifically to FIGS. 3–9 of the drawings, the rocket R comprises right and left sections secured by a back transverse mounting bracket 21 beneath and against transverse members 23 forming part of the seat*'s bottom frame 3*. Each rocket section is shown to have three separate rockets, although it will be understood that a section might contain any desired number of rockets within the limitations of the space available. The rocket sections are conveniently formed from tubes 25, which are threaded into a forward header 27 and a back nozzle housing 29. *As shown in FIGS. 3 and 4, the member 21 is a channel extending across the rear side of nozzle housings 29 and bolted thereto, while the upper side of the nozzle housings abut the rearward one of members 23, thereby providing a secure thrust-transmitting connection with the seat structure adjacent the locus of thrust generation.*

Each header 27 includes a pair of igniters generally designated 31 threaded into the headers at points generally between the tubes 25. The igniters are of the pressure actuated type in that a pressure line (not shown) is connected thereto. When pressurized fluid is injected into the igniter (FIG. 9), a hammer 33 is driven against a percussion element 35, which then ignites. The tubes 25 are threaded only partially into the header so as to leave a space 37 at the back for progression of the igniter flame into the tubes 25. The rocket propellant may be in the form of a molded star or grain of other cross section so that the products of combustion may pass through to the nozzle section 29.

The space 37 by which the tubes 25 are interconnected is desirable in providing for crossover ignition. In other words, several rocket chambers are interconnected through the space 37, with the result that ignition in any one chamber will result in ignition of the other chambers of the interconnected cluster. The heat and pressure of the combustion gases from the ignited tube pass through the passageway formed by space 37 to the other tubes, so as to cause combustion in the other tubes. In the disclosed embodiment, [the] *a* crossover passage is formed in *both* the header 27 *and in the nozzle header or housing 29,* but it might be formed in other ways.

*In the embodiment shown, the* [The] nozzle housing is formed with a series of canted conical nozzle openings or passages 39 (FIG. 6), there being a separate opening opposite each tube 25. A nozzle 41 is normally retracted within each opening 39 and releasably secured in the retracted position by a closure plate 43, which is releasably secured within a groove 45 by spinning over or upsetting the adjacent part of the nozzle housing into holding engagement with the plate.

The retracted nozzle is an important feature of this invention, in that it provides for an extremely compact rocket. The interior of the nozzle 41 is formed of typical conical shape and the exterior portion is generally cylindric. Accordingly, when the rocket propellant is fired, the nozzle is extended outwardly to the position of FIG. 7, thereby providing an adequate opening at 47 for passage of the propellant gases to the nozzle. The cap 43 is also blown clear.

Figure 8:
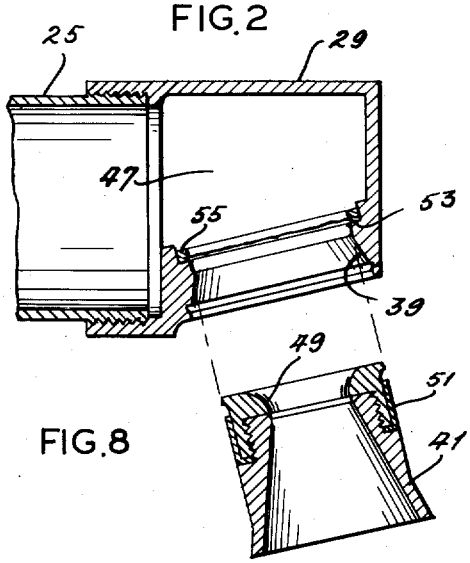
FIG. 8 is a view similar to that of FIG. 7, but with the nozzle blown clear of the rocket as a safety measure.

An additional feature of the nozzle construction is the safety pop-out condition shown in FIG. 8. A back portion 49 of the nozzle is threaded into the front portion 41, and a spring cup 51 is secured between the two parts 41 and 49. The cup 51 is formed with a lip 52 adapted to seat against the shoulder 53 when the nozzle is extended, but if the pressure within the rocket should inadvertently rise to excessive levels, the lip 52 is sheared off and a lip 55 on the nozzle is also sheared off, thereby permitting the entire nozzle to be expelled from the rocket, with the result that the gases may escape through the larger opening 39.

Figure 6:
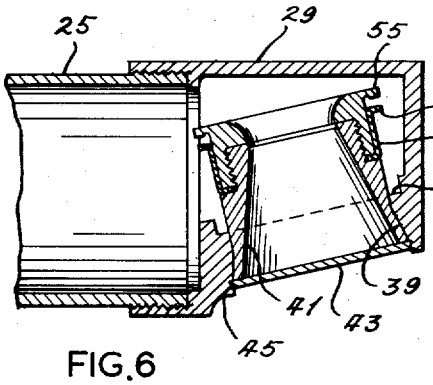
FIG. 6 is a section of the nozzle of a rocket as taken on the line 6—6 of FIG. 3, the nozzle being in its initial retracted position.
Figure 9:
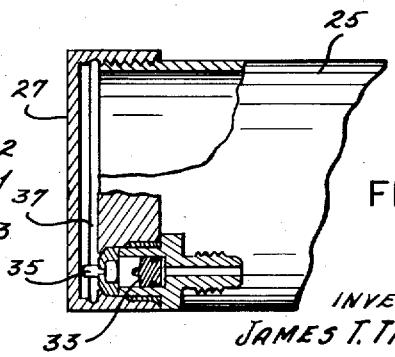
FIG. 9 is a detail section at the opposite end of the rocket as taken on the line 9—9 of FIG. 5.
Figure 5:
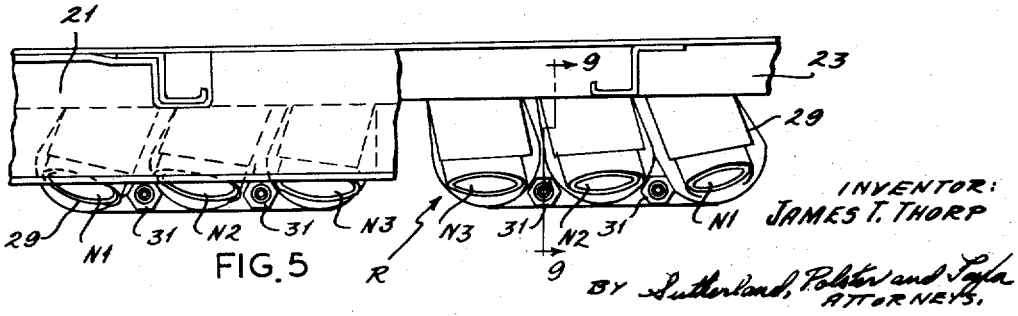
FIG. 5 is a back elevation of the rocket assembly *shown in FIG. 3*.

Referring to FIG. 5, it will be seen that the nozzles are canted outwardly or sidewise, but at different angles. The angles are selected so that the thrust of each rocket passes through or near the center of gravity, thereby minimizing sidewise tumbling in the event that the thrust of individual rockets vary. In addition, as shown in FIG. 6, each nozzle is at an angle of about 10° with respect to a vertical tranverse (*port-starboard*) plane. The particular angle necessarily determines the amount of forward thrust, and the rockets are positioned so that the line of thrust extends near the center of gravity of the seat-occupant mass. *Preferably* [Actually], the line of thrust should pass slightly behind the center of gravity so as to provide a forward turning force upon the seat-occupant mass, which will counteract the rearward tipping action of the air stream, when the seat occupant first enters it.

*Morever, a direct mechanical connection between the nozzle ends of the several rockets as provided by the transverse member 21, or by the nozzle header, stabilizes the thrusts of the respective rockets relative to each other, stabilizes one group relative to another, and, when the direct mechanical connection is also joined directly to the seat's bottom frame, as shown, minimizes vibration problems and their transmission to, and effect upon, the ejected seat.*

It will be understood that the rocket system disclosed may be used in conjunction with a catapult or other supplementary ejectors or it may be used as the sole means of ejection. When used with a catapult, the air lines to the igniter are relatively flexible to permit movement from the catapult prior to firing of the rockets. Furthermore, certain features of this invention may have utility in other rocket or ejecting situations.

Changes in and modifications of the construction described may be made without departing from the spirit of my invention or sacrificing its advantages.

Having thus described the invention, what is claimed and desired to be secured by Letters Patent is:

1. A rocket comprising an elongate body portion containing a propellant and a nozzle housing formed at one end thereof, said nozzle housing having a nozzle-containing passage extending therethrough at an angle with respect to the longitudinal axis of the rocket, a nozzle element slidably received in said passage for movement from a retracted position substantially within the lateral confines of the rocket to an advanced position wherein the nozzle projects from the rocket transversely thereof.

2. A rocket as set forth in claim 1, further including a cap releasably secured over the outer end of said passage, thereby initially to retain the nozzle element at its retracted position within the housing.

3. A rocket as set forth in claim 1, further including pressure-responsive means releasably holding the nozzle element in its retracted position, said holding means being of a character such as to release the nozzle element for movement to its advanced position upon the development of a predetermined pressure within the rocket, whereby said nozzle element is automatically advanced by the pressure of propellant gases.

4. An ejecting seat having a back and a bottom, a plurality of elongate rockets mounted on and beneath the seat bottom so as to extend front to back in generally parallel relationship to the bottom of the seat, said rockets being mounted in spaced relationship on opposite sides of the front to back center line of the seat, each rocket having a separate nozzle adjacent the back of the seat and said nozzles being canted downward, rearward and laterally outward with respect to the longitudinal axes of the rockets.

5. In an elongate rocket having a propellant chamber and a nozzle chamber with a passage therebetween, the improvement that comprises a nozzle mounted within the nozzle chamber and retracted within the lateral confines of the rocket, thereby to minimize lateral projection of the nozzle, said nozzle being mounted for movement in a direction transverse to the longitudinal axes of the rocket from its retracted position to an advanced position wherein the nozzle projects substantially beyond the lateral confines of the rocket, the nozzle having an inner end portion tending to obstruct the passage between the propellant and nozzle chambers when the nozzle is in its retracted position, said passage being relatively unobstructed when the nozzle is in its advanced position.

6. A rocket as set forth in claim 5 wherein said nozzle is completely retracted within the nozzle chamber, and a closure member releasably secured over said nozzle to hold the nozzle within its chamber, said closure member releasing under a predetermined pressure to permit movement of the nozzle to its advanced position.

7. A rocket ejection unit comprising a multiplicity of elongate rockets arranged parallel to one another in a common plane and in close proximity to one another to produce a compact assembly, each of said rockets having a canted nozzle, the respective nozzles having their center lines of thrust addressed generally toward a common point lying outside said plane.

8. The combination of a mass to be ejected and a rocket assembly for ejecting said mass, the mass having a predetermined center of gravity and a side area opposite from the direction of ejection for holding the rocket, the rocket assembly being mounted against said side area generally opposite the center of gravity, said assembly having a multiplicity of rockets arranged in parallel close relationship to one another with all of the rockets lying in a common plane generally parallel to the side of the mass, the rockets being symmetrically disposed in a pair of groups with each group lying on the opposite side of a second plane extending through said center of gravity and perpendicular to the plane defined by said multiplicity of rockets, each rocket having a separate nozzle canted with respect to the axes of the rocket and disposed so that the center lines of thrust of the nozzles are addressed toward a common point adjacent said center of gravity.

*9. In a vehicle seat having a bottom frame extending sidewardly below, as well as forwardly and rearwardly*

*of, the center of gravity of the seat-occupant mass, a plurality of rocket sections mounted on said bottom frame, each rocket section having at least one nozzle, the nozzles of the respective rocket sections being on the opposite sides of a vertical plane extending in the fore-aft direction through said center of gravity, and said nozzles being so addressed that the center lines of their thrusts define a plane whose intersection with said vertical plane is substantially coincident with said center of gravity.*

*10. In a vehicle seat having a bottom frame extending sidewardly below, as well as forwardly and rearwardly of, the center of gravity of the seat-occupant mass, a back frame located behind said center of gravity, a rocket assembly mounted on said bottom frame beneath said seat, said rocket assembly including a plurality of elongate propellant chambers and nozzle means therefor, said propellant chambers lying substantially entirely ahead of said back frame, and said nozzle means being so oriented that the center line of its thrust lies in a plane which substantially approaches said center of gravity but makes a substantial angle with the longitudinal axes of said propellant chambers.*

*11. The combination of claim 10 in which a common header interconnects a plurality of chambers.*

*12. The combination of claim 10 in which the respective chambers have an ignition end and a nozzle end, and a common header at at least one of said ends providing intercommunication between a plurality of chambers.*

*13. The combination of claim 12 in which the header is at the ignition end of said chambers.*

*14. The combination of claim 12 in which the header is at the nozzle end of said chambers.*

*15. The combination of claim 10 in which the respective chambers have a nozzle end, and a structural member at the nozzle ends of said chambers interconnecting the same in thrust-transmitting relationship with said bottom frame.*

*16. The combination with a vehicle having an ejectable seat of a rocket ejection unit comprising a plurality of elongate rocket propellant charges arranged with longitudinal axes lying generally parallel with and below the surface of the seat engaged by the buttocks of an occupant, the dimension of said charges perpendicular to said surface being less than the distance between said surface and the vehicle floor, and nozzle means for said charges, said nozzle means being addressed downwardly in a direction such that the center line of thrust therefrom is in a plane which embraces a point proximate the center of gravity of the seat-occupant mass.*

*17. The combination of claim 16 wherein the charges are arranged in equal groups, the respective groups being disposed on opposite sides of said center of gravity.*

*18. The combination of claim 16 wherein a catapult is provided to initiate ejecting movement of the seat prior to the firing of the charges.*

*19. The combination of claim 16 wherein part of the propellant charge of the rocket unit is disposed forwardly of said center of gravity.*

*20. The combination of claim 19 where another part of the propellant charge of the rocket unit is disposed rearwardly of said center of gravity.*

References Cited in the file of this patent or the original patent

UNITED STATES PATENTS

| | | |
|---|---|---|
| 1,611,353 | Lepinte | Dec. 21, 1926 |
| 2,522,497 | Roach et al. | May 8, 1951 |
| 2,552,181 | Kleinhans | May 8, 1951 |
| 2,670,596 | Whitworth | Mar. 2, 1954 |
| 2,824,711 | Porter | Feb. 25, 1958 |
| 2,898,856 | Lightbody et al. | Aug. 11, 1959 |
| 2,900,150 | Hirt et al. | Aug. 18, 1959 |
| 2,958,185 | Sanders | Nov. 1, 1960 |
| 2,960,034 | Besserer | Nov. 15, 1960 |
| 2,998,213 | Pitts | Aug. 29, 1961 |

FOREIGN PATENTS

| | | |
|---|---|---|
| 918,006 | Germany | Sept. 20, 1954 |